United States Patent
Sato et al.

(10) Patent No.: US 8,185,061 B2
(45) Date of Patent: May 22, 2012

(54) WIRELESS TERMINAL WITH FREQUENCY SWITCHING CIRCUITS FOR CONTROLLING AN OPERATING FREQUENCY

(75) Inventors: Koichi Sato, Tachikawa (JP); Satoshi Mizoguchi, Ome (JP); Isao Ohba, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 12/724,669

(22) Filed: Mar. 16, 2010

(65) Prior Publication Data

US 2011/0070843 A1  Mar. 24, 2011

(30) Foreign Application Priority Data

Sep. 24, 2009  (JP) ................ 2009-218701

(51) Int. Cl.
| | |
|---|---|
| H04B 1/40 | (2006.01) |
| H04B 1/00 | (2006.01) |
| H04B 15/00 | (2006.01) |
| H04B 1/44 | (2006.01) |
| H04B 1/18 | (2006.01) |
| H04M 1/00 | (2006.01) |
| G06F 3/033 | (2006.01) |

(52) U.S. Cl. ............. 455/75; 455/63.3; 455/78; 455/83; 455/192.1; 455/575.5; 455/130

(58) Field of Classification Search ............ 455/78, 455/83, 63.3, 75, 182.1, 192.1, 82, 130, 575.5
See application file for complete search history.

(56) References Cited

U.S. PATENT DOCUMENTS

| | | | |
|---|---|---|---|
| 7,269,440 B2 | 9/2007 | Ueda | |
| 7,348,926 B2 | 3/2008 | Ueda | |
| 2004/0217914 A1 * | 11/2004 | Yamashita et al. | 343/850 |
| 2006/0118951 A1 * | 6/2006 | Ogawa et al. | 257/728 |
| 2009/0069062 A1 | 3/2009 | Suzuki et al. | |

FOREIGN PATENT DOCUMENTS

| | | |
|---|---|---|
| JP | 2003-332938 A | 11/2003 |
| JP | 2008-086194 A | 4/2008 |
| JP | 2009-071513 A | 4/2009 |
| WO | 2007/143616 A2 | 12/2007 |

OTHER PUBLICATIONS

Japanese Office Action dated May 24, 2011, issued in counterpart Japanese Application No. 2009-218701, and English translation thereof.

* cited by examiner

*Primary Examiner* — Temesgh Ghebretinsae
*Assistant Examiner* — Devan Sandiford
(74) *Attorney, Agent, or Firm* — Holtz, Holtz, Goodman & Chick, PC

(57) ABSTRACT

A wireless terminal includes an antenna which comprises an antenna element and at least one frequency switching circuit to control an operating frequency of the antenna element in accordance with a frequency control signal, a plurality of RF circuits to perform an RF signal processing, an antenna switch to connect the antenna to one of the plurality of RF circuits in accordance with a connection control signal, and a generation unit configured to generate the frequency control signal and the connection control signal in accordance with switching between a plurality of wireless communication systems or switching between transmission and reception.

4 Claims, 7 Drawing Sheets

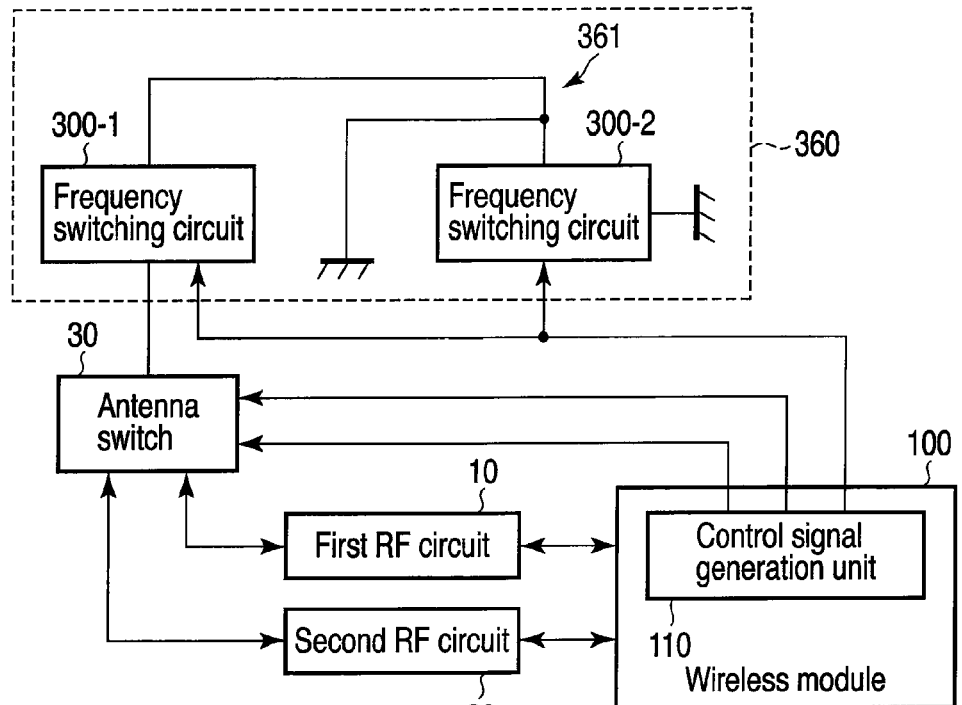
F I G. 7
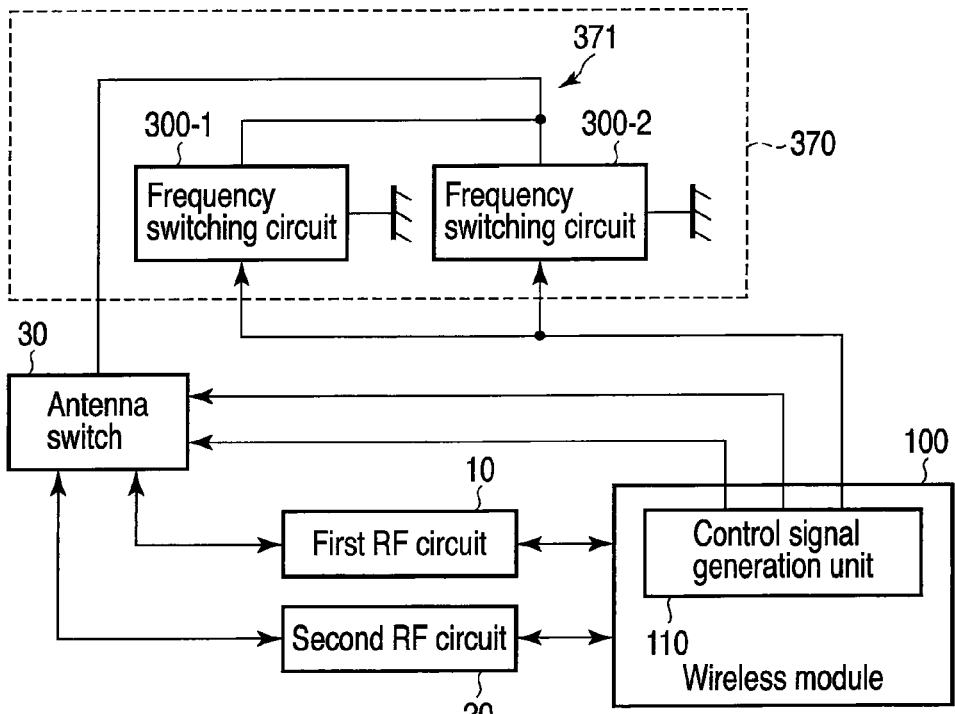
F I G. 8

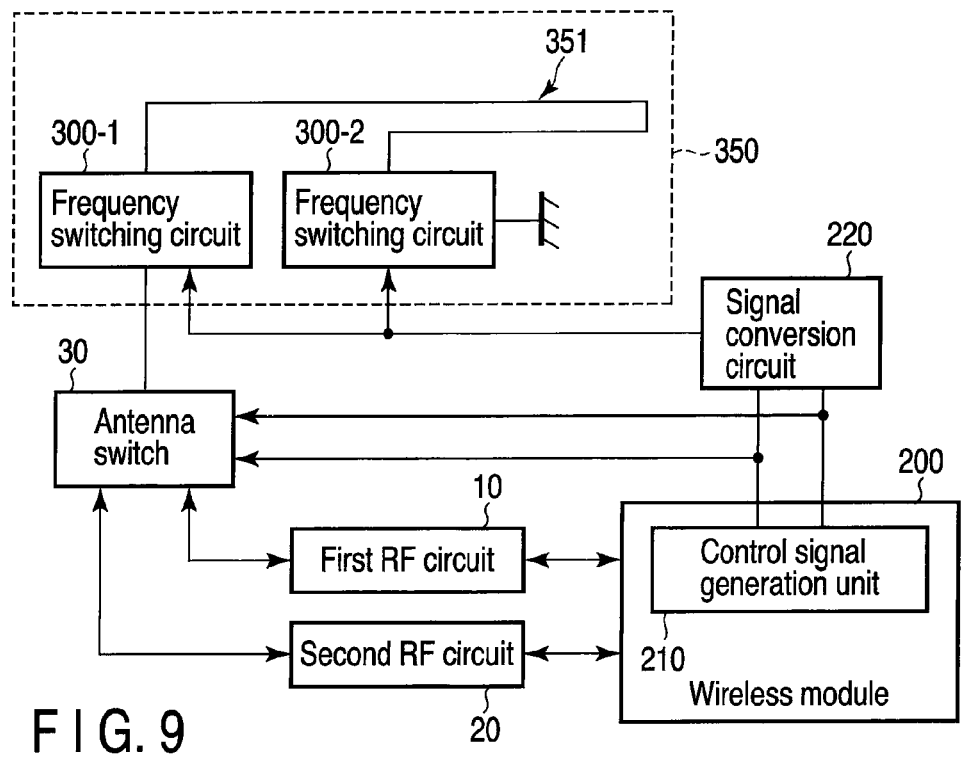
F I G. 9
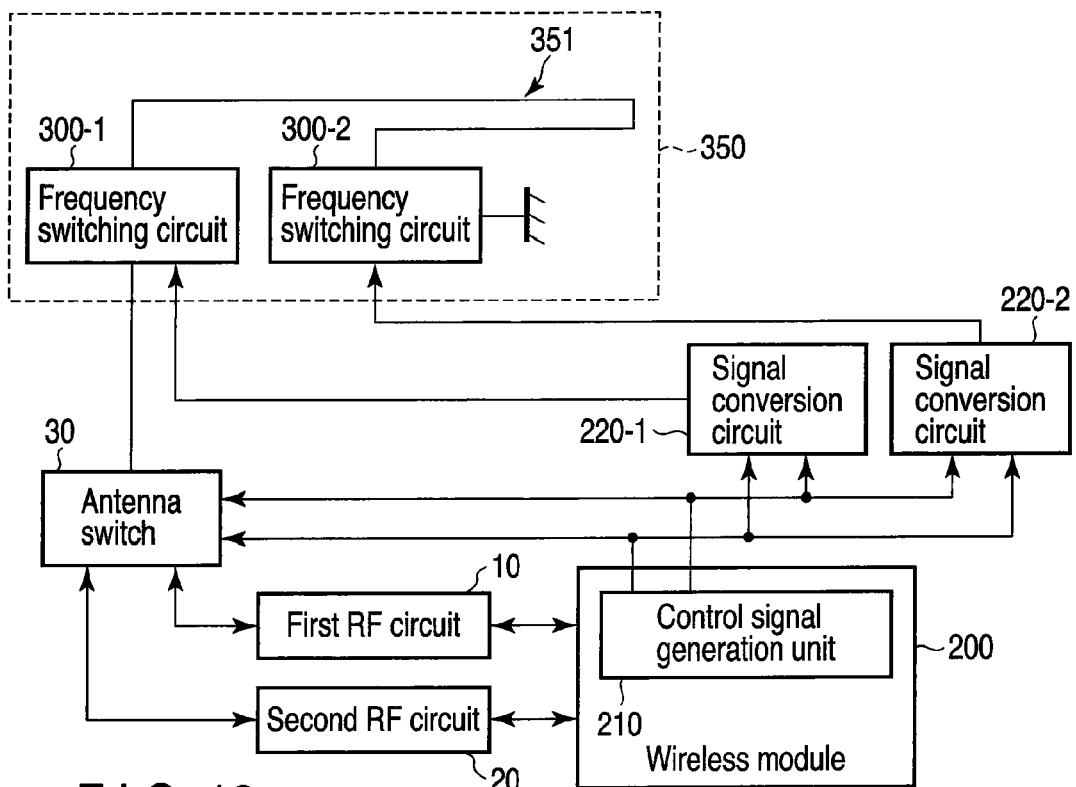
F I G. 10

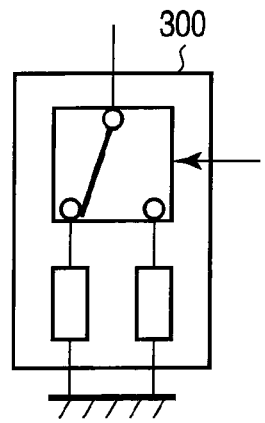
F I G. 11A
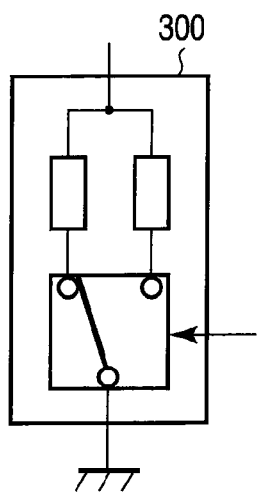
F I G. 11B
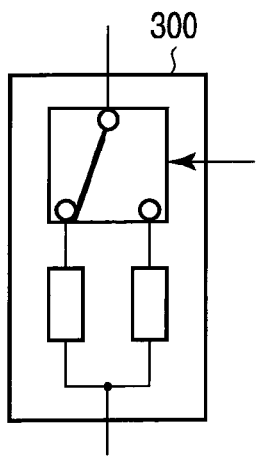
F I G. 11C

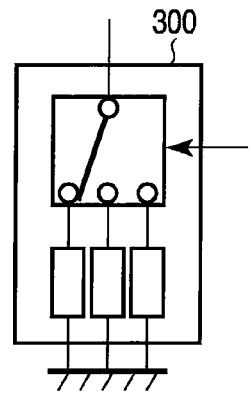
F I G. 12A
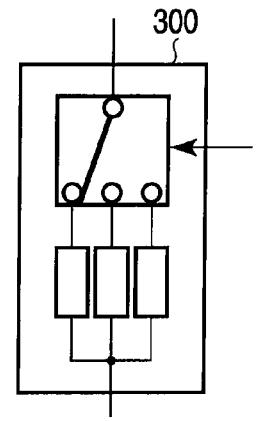
F I G. 12C
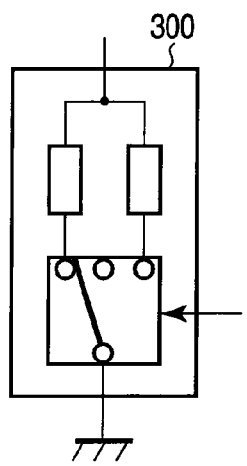
F I G. 12B
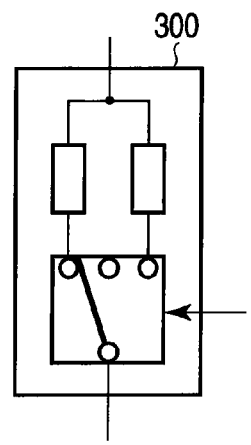
F I G. 12D
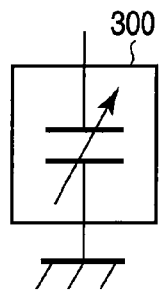
F I G. 13A
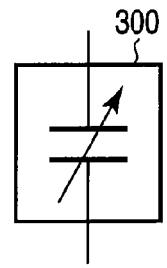
F I G. 13B

WIRELESS TERMINAL WITH FREQUENCY SWITCHING CIRCUITS FOR CONTROLLING AN OPERATING FREQUENCY

CROSS-REFERENCE TO RELATED APPLICATIONS

This application is based upon and claims the benefit of priority from prior Japanese Patent Application No. 2009-218701, filed Sep. 24, 2009, the entire contents of which are incorporated herein by reference.

BACKGROUND OF THE INVENTION

1. Field of the Invention

The present invention relates to a wireless terminal which comprises a reconfigurable antenna and a plurality of RF circuits.

2. Description of the Related Art

Various conventional wireless communication systems have been established, such as Global System for Mobile Communications (GSM) and Wideband Code Division Multiple Access (WCDMA). With diversification of such wireless communication systems, technical demands are rising for wireless terminals (such as mobile phones and personal computers) which support a plurality of wireless communication systems.

In order to support a plurality of wireless communication systems, an antenna which covers a broad band is required. On the other side, antennas mounted on wireless terminals are demanded to have a small size. In general, a trade-off takes place between downsizing of an antenna and band broadening of the antenna. A known solution to these two demands is a so-called reconfigurable antenna. The reconfigurable antenna is capable of substantially covering a broad band by dynamically switching limited operating bands.

Jpn. Pat. Appln. KOKAI Publication No. 2003-332938 may be introduced as an example of a technique for reconfigurable antenna. A mobile phone device described in the publication No. 2003-332938 dynamically changes a ground length on the basis of a band specific to a wireless communication system to use with. The mobile phone device described in the publication No. 2003-332938 is capable of optimizing antenna characteristics (radiation patterns at each frequency), with respect to the wireless communication system to use with.

Wireless terminals are sometimes designed such that each wireless terminal comprises a plurality of RF circuits in order to achieve switching between wireless communication systems or switching between signal transmission and reception. Usually, a wireless terminal comprising a plurality of RF circuits comprises an antenna switch for connecting an antenna selectively to the plurality of RF circuits. Based on switching between wireless communication systems or switching between signal transmission and reception, a wireless module controls the antenna switch to connect one of the plurality of RF circuits to the antenna.

The technique for reconfigurable antenna according to the publication No. 2003-332938 or any other technique for reconfigurable antenna is supposed to be applied to an antenna in a wireless terminal comprising a plurality of RF circuits. Here, a selection control for selection from a plurality of RF circuits (i.e., a control on an antenna switch), and a control of an operating frequency of a reconfigurable antenna are respectively different techniques. However, when combining and implementing both techniques together, both techniques are desirably synchronized (or linked) with each other.

The related art including the publication No. 2003-332938 neither discloses nor suggests a configuration of achieving synchronization of both techniques.

The invention hence has an object of providing a wireless terminal capable of synchronizing a selection control for selection from a plurality of RF circuits and a control of an operating frequency of an antenna.

BRIEF SUMMARY OF THE INVENTION

According to an aspect of the invention, there is provided a wireless terminal, comprising: an antenna which comprises an antenna element and at least one frequency switching circuit to control an operating frequency of the antenna element in accordance with a frequency control signal; a plurality of RF circuits to perform an RF signal processing; an antenna switch to connect the antenna to one of the plurality of RF circuits in accordance with a connection control signal; and a generation unit configured to generate the frequency control signal and the connection control signal in accordance with switching between a plurality of wireless communication systems or switching between transmission and reception.

According to another aspect of the invention, there is provided a wireless terminal, comprising: an antenna which comprises an antenna element and at least one frequency switching circuit to control an operating frequency of the antenna element in accordance with a frequency control signal; a plurality of RF circuits to perform an RF signal processing; an antenna switch to connect the antenna to one of the plurality of RF circuits in accordance with a connection control signal; a generation unit configured to generate the connection control signal in accordance with switching between wireless communication systems or switching between transmission and reception; and a conversion circuit to convert the connection control signal into the frequency control signal.

According to another aspect of the invention, there is provided a wireless terminal, comprising: a plurality of RF circuits to perform an RF signal processing; an antenna switch to connect an antenna to one of the plurality of RF circuit in accordance with a connection control signal, the antenna being capable of controlling an operating frequency by a frequency control signal; and a generation unit configured to generate the frequency control signal and the connection control signal in accordance with switching between wireless communication systems or switching between transmission and reception.

BRIEF DESCRIPTION OF THE SEVERAL VIEWS OF THE DRAWING

FIG. 7 is a block diagram representing an example of a wireless terminal according to the first embodiment;

FIG. 8 is a block diagram representing an example of a wireless terminal according to the first embodiment;

FIG. 9 is a block diagram representing an example of a wireless terminal according to the second embodiment;

FIG. 10 is a block diagram representing an example of a wireless terminal according to the second embodiment;

FIG. 11A is a block diagram representing an example of a frequency switching circuit;

FIG. 11B is a block diagram representing an example of a frequency switching circuit;

FIG. 11C is a block diagram representing an example of a frequency switching circuit;

FIG. 12A is a block diagram representing an example of a frequency switching circuit;

FIG. 12B is a block diagram representing an example of a frequency switching circuit;

FIG. 12C is a block diagram representing an example of a frequency switching circuit;

FIG. 12D is a block diagram representing an example of a frequency switching circuit;

FIG. 13A is a block diagram representing an example of a frequency switching circuit; and FIG. 13B is a block diagram representing an example of a frequency switching circuit.

DETAILED DESCRIPTION OF THE INVENTION

Hereinafter, embodiments of the invention will be described with reference to the drawings.

(First Embodiment)

Figure 1:
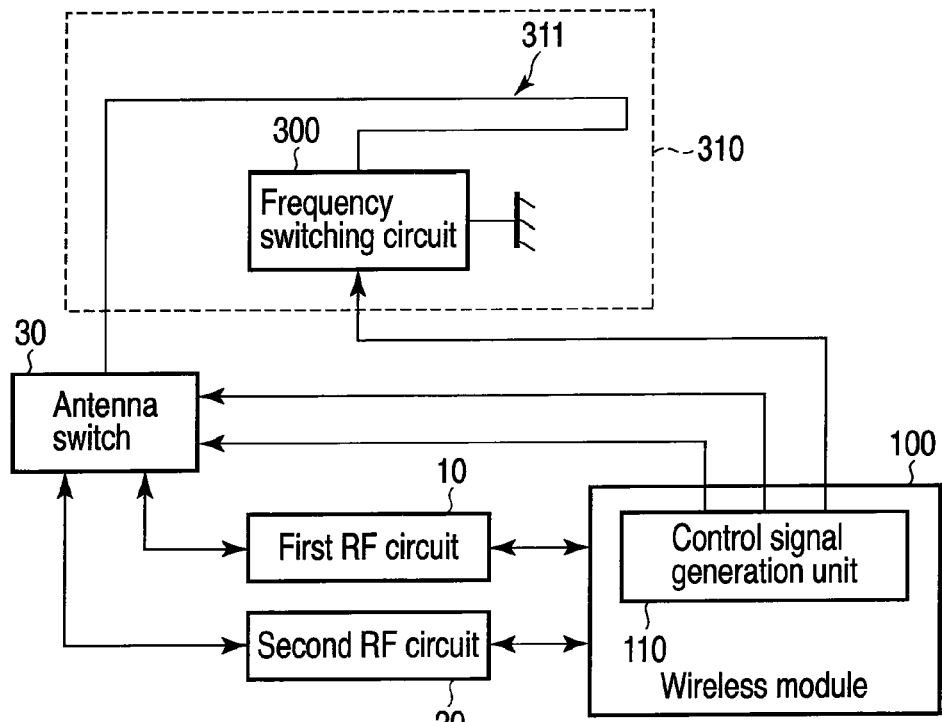
FIG. 1 is a block diagram representing an example of a wireless terminal according to the first embodiment.

As represented in FIG. 1, a wireless terminal according to a first embodiment of the invention comprises a first RF circuit 10, a second RF circuit 20, an antenna switch 30, a wireless module 100, and an antenna 310. The wireless terminal represented in FIG. 1 uses the first RF circuit 10 and the second RF circuit 20 by switching these circuits 10 and 20 in accordance with switching between wireless communication systems or switching between transmission and reception. The antenna 310 is a so-called reconfigurable antenna (or a frequency-tunable antenna).

The first RF circuit 10 performs a first RF signal processing. The second RF circuit 20 performs a second RF signal processing. The first and second RF signal processings are complementary to each other. For example, the first RF signal processing is a processing for signal transmission, and the second RF signal processing is a processing for signal reception. Further, for example, the first RF signal processing is a processing for part of a plurality of wireless communication systems which are supported by the wireless terminal in FIG. 1. The second RF signal processing is a processing for remaining part of the systems. Specifically, the first RF circuit 10 and the second RF circuit 20 are respectively allotted with parts of RF signal processings required for the wireless terminal in FIG. 1. The wireless terminal in FIG. 1 may comprise three or more RF circuits.

Regarding signal transmission, the first RF circuit 10 and second RF circuit 20 upconvert a baseband signal from the wireless module 100 to a radio frequency band, and inputs the upconverted signal to the antenna 310 through the antenna switch 30. Regarding signal reception, the first RF circuit 10 and second RF circuit 20 downconvert an RF signal from the antenna switch 30 to a baseband, and inputs the downconverted signal to the wireless module 100.

The antenna switch 30 connects one of the first RF circuit 10 and second RF circuit 20 to the antenna 310 in accordance with a connection control signal described later.

The antenna 310 comprises a frequency switching circuit 300 and an antenna element 311. Regarding signal reception, the antenna 310 receives an RF signal from space, and supplies the RF signal to the first RF circuit 10 or second RF circuit 20 through the antenna switch 30. Regarding signal transmission, the antenna 310 radiates the RF signal from the antenna switch 30 to space.

The frequency switching circuit 300 is input with a frequency control signal described later. The frequency switching circuit 300 switches an operating frequency of the antenna element 311 in accordance with the frequency control signal. For example, the frequency switching circuit 300 is a combination of a switch which switches connections in accordance with the frequency control signal, such as a metal-semiconductor field effect transistor (MESFET) or a p-intrinsic-n (PIN) diode, or a variable capacitance element whose capacitance value varies in accordance with the frequency control signal, such as MEMS or a varicap diode, with chip components (lumped-parameter elements such as an inductor, a capacitor, and a resistor). Alternatively, any other arbitrary existing circuit may be used as the frequency switching circuit 300.

Figure 2:
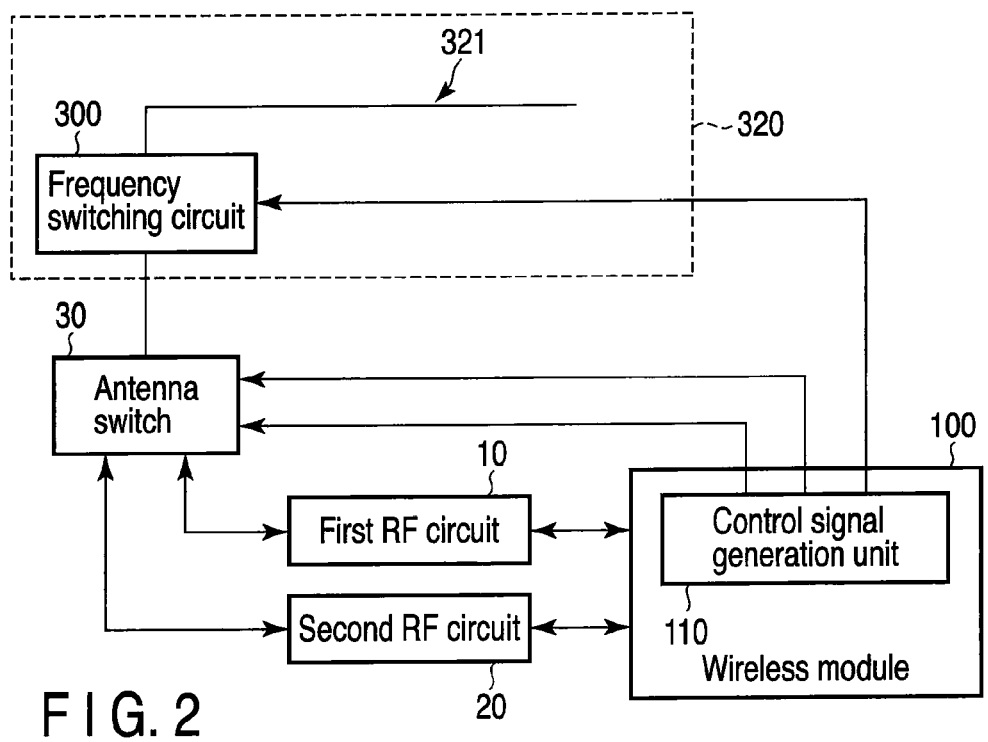
FIG. 2 is a block diagram representing an example of a wireless terminal according to the first embodiment.

The antenna element 311 is a so-called folded monopole antenna. The frequency switching circuit 300 is inserted in a backward part (in a grounded side) of the antenna element 311. The wireless terminal according to this embodiment is implementable even if the folded monopole antenna is replaced with a different type of antenna element. Specifically, the antenna element 311 may be, for example, an inverted L antenna, an inverted F antenna, a folded antenna, a monopole antenna, or a loop antenna. FIG. 2 represents the wireless terminal according to this embodiment in a case of using an antenna 320 comprising an inverted L antenna as an antenna element 321.

The wireless module 100 performs various processings including a baseband signal processing and a protocol processing. The wireless module 100 comprises a control signal generation unit 110. The control signal generation unit 110 generates a connection control signal and the frequency control signal.

Conventionally, in order to generate a connection control signal, a table is used which associates types of wireless communication systems or transmission/reception states with values of the connection control signal. The control signal generation unit 110 modifies and uses the existing conversion table. Specifically, the control signal generation unit 110 generates a connection control signal and a frequency control signal in accordance with switching between the wireless communication systems or switching between signal transmission and signal reception, by using the table which associates types of wireless communication systems or transmission/reception states with both values of the connection control signal and values of the frequency control signal. Any unused port of the wireless module 100 is usable as an output terminal for the frequency control signal.

Thus, synchronization between the selection control for selection from a plurality of RF circuits (e.g., the first RF circuit 10 and second RF circuit 20) and the operating frequency control of the antenna 310 is ensured by generating the connection control signal and frequency control signal with use of a common conversion table. From a viewpoint of stable operations of the first RF circuit 10 and second RF circuit 20, the frequency switching circuit 300 is desirably switched first, and then the antenna switch 30 follows. In order to maintain such a timing relationship between both of the frequency switching circuit 300 and the antenna switch 30, parameters for the wireless module 100 or the control signal generation unit 110 may be controlled and/or a delay element may be used.

The wireless terminal according to this embodiment will now be described in more details with reference to FIG. 4. The wireless terminal in FIG. 4 corresponds to a configuration which is attained by replacing the antenna 310 with an antenna 340 in the wireless terminal in FIG. 1.

The antenna 340 comprises two antenna elements 341 and 342. The antenna element 341 is a folded monopole antenna. A point on a forward part from the folding portion of the antenna element 341 and a point on the backward part thereof are short-circuited to each other by a stab 343. The antenna element 342 is an inverted L antenna branched from the forward part from the folding portion of the antenna element 341. The frequency switching circuit 300 is inserted in the backward part of the antenna element 341.

Here, an electric length to an end point of the antenna element 341 from a start point of the antenna element 341 through the forward part from the folding portion, the stab 343 and the backward part is desirably substantial ½ of a wavelength of a resonance frequency of the antenna element 342. By designing the stab 343 in this manner, influence on the antenna element 342 from the frequency switching circuit 300 can be reduced. Specifically, even if the resonance frequency of the antenna element 341 is switched, the resonance frequency of the antenna element 342 hardly changes. Thus, the antenna 340 is capable of adding a resonance mode which is hardly affected by the frequency switching circuit 300. In general, the more an antenna is downsized, the more difficult it is to design the antenna to have a low operating frequency. Therefore, a large number of wireless communication systems can be supported by assigning the antenna element 341 capable of switching operating frequencies to wireless communication systems using low frequencies and by assigning the antenna element 342 whose frequency hardly changes to wireless communication systems using high frequencies. For example, if an operating band of the antenna element 342 is set to a band of 1.7 GHz to 2.1 GHz, GSM 1800, GSM 1900, WCDMA I (2 GHz band), and WCDMA II (1.9 GHz band) can be supported. On the other side, if the operating band of the antenna element 341 is set to a band of 800 MHz to 900 MHz by using the frequency switching circuit 300, GSM 850, WCDMA VI (850 MHz band), and GSM 900 (900 MHz band) can be supported.

Figure 4:
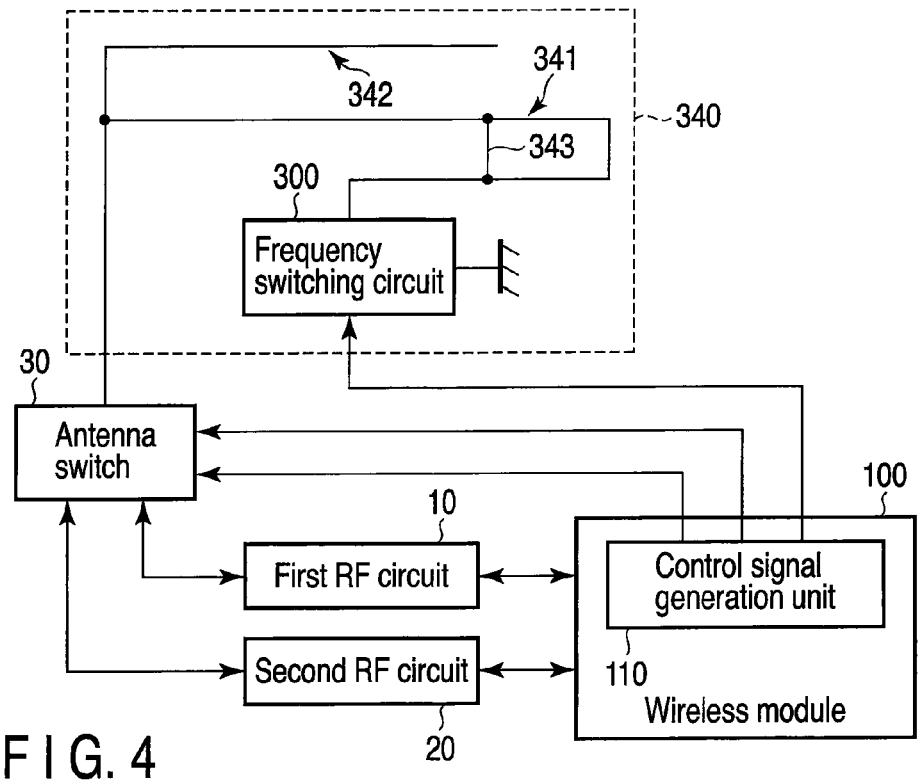
FIG. 4 is a block diagram representing an example of a wireless terminal according to the first embodiment.

The wireless terminals represented in FIGS. 1, 2, and 4 each are provided with one frequency switching circuit 300. However, the wireless terminals each may comprise a plurality of frequency switching circuits 300 in this embodiment. By providing a plurality of frequency switching circuits 300, the operating frequency of the antenna can be controlled more finely. Locations of the frequency switching circuits 300 can be typified into three locations. Specifically, the three locations are in: (1) a side of a feeding point of an antenna element (including a short point on the feeding point side); (2) a side of a tip end of the antenna element (a folding point insofar as a folded antenna is concerned); and (3) a side of a short point of the antenna element (a grounded point). Naturally, if there is no short point on the antenna element, any frequency switching circuit 300 cannot be provided in the side of any short point on the antenna element. Details of the locations of the frequency switching circuits 300 are determined by designing in consideration of loss due to active elements comprised in the frequency switching circuits 300.

A configuration example will now be described below in case of providing the folded monopole antenna with two frequency switching circuits 300-1 and 300-2.

Figure 5:
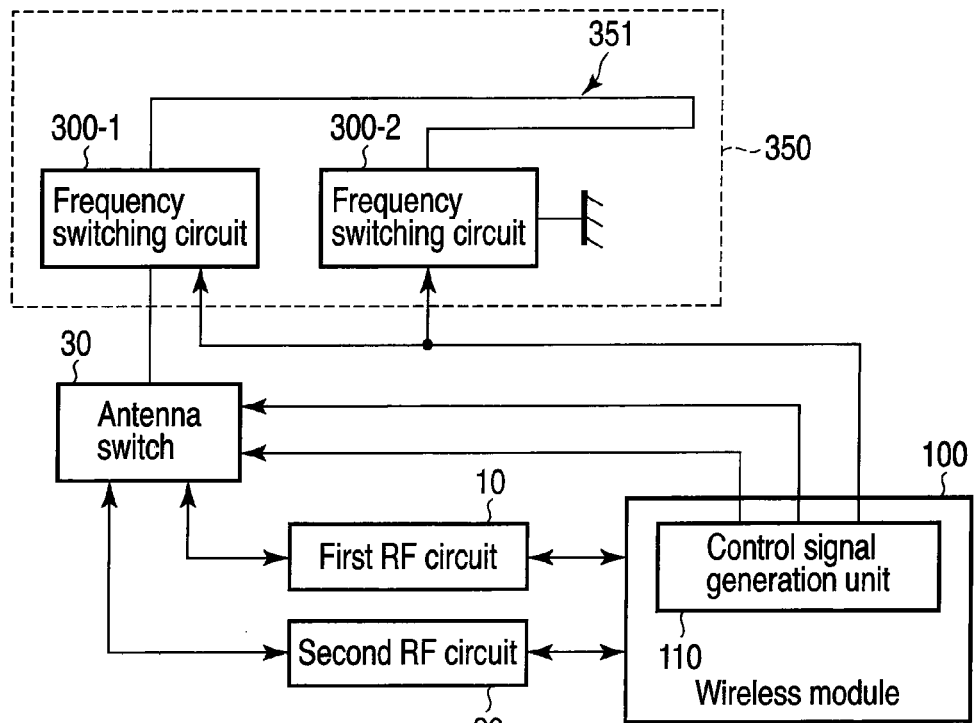
FIG. 5 is a block diagram representing an example of a wireless terminal according to the first embodiment.
Figure 6:
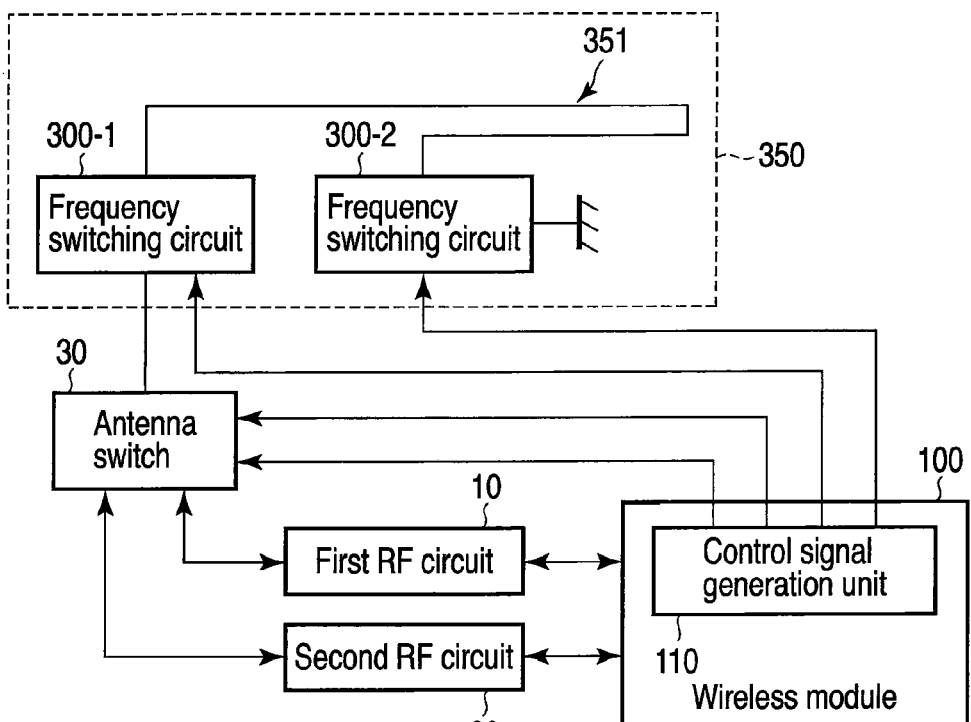
FIG. 6 is a block diagram representing an example of a wireless terminal according to the first embodiment.

In wireless terminals represented in FIGS. 5 and 6 each, the frequency switching circuits 300-1 and 300-2 are provided respectively in (1) the side of a feeding point of an antenna element 351 and in (3) the side of a short point of the antenna element 351. In the wireless terminal in FIG. 5, the frequency switching circuits 300-1 and 300-2 are controlled by a common frequency control signal. On the other side, in the wireless terminal in FIG. 6, the frequency switching circuits 300-1 and 300-2 are respectively controlled by individual frequency control signals. If the plurality of frequency switching circuits 300 are controlled by a common frequency control signal, as in the wireless terminal in FIG. 5, a control signal generation unit 110 can be constructed in a simple configuration (i.e., the same configuration as that in a case of using only one frequency switching circuit 300). Otherwise, if the plurality of frequency switching circuits 300 are respectively controlled by individual frequency control signals, as in the wireless terminal in FIG. 6, individuals of the frequency switching circuits 300 can be controlled independently from each other, and accordingly, the operating frequency of the antenna can be controlled more finely. However, in a case of generating individual frequency control signals, a plurality of output terminals (unused ports of the wireless module 100) are required to output the plurality of frequency control signals.

FIG. 7 represents a wireless terminal according to this embodiment in a case of providing the plurality of frequency switching circuits 300-1 and 300-2 respectively in (1) the side of a feeding point for an antenna element 361 and in (2) the side of a folding point of the antenna element 361. In the wireless terminal represented in FIG. 7, the frequency switching circuits 300-1 and 300-2 may be respectively controlled by individual frequency control signals. FIG. 8 represents a wireless terminal according to this embodiment in a case of providing the plurality of frequency switching circuits 300-1 and 300-2 respectively in (2) the side of a folding point of an antenna element 371 and in (3) the side of a short point of the antenna element 371. In the wireless terminal represented in FIG. 8, the frequency switching circuits 300-1 and 300-2 may be respectively controlled by individual frequency control signal.

A specific example of the frequency switching circuit 300 will now be introduced in details below.

As represented in FIGS. 11A, 11B, and 11C, the frequency switching circuit 300 may be configured by, for example, a two-way switch and two chip components. Alternatively as represented in FIGS. 12A and 12C, the frequency switching circuit 300 may be constituted by, for example, a three-way switch and three chip components. Still alternatively as represented in FIGS. 12B and 12D, the frequency switching circuit 300 may be constituted by, for example, a three-way switch and two chip components. Otherwise, a four- or more-way switch may be incorporated in the frequency switching circuit 300. In general, as the number of selectable ways of a switch increases, the operating frequency of an antenna can be controlled more finely while an information amount (bit length) of the frequency control signal increases. As represented in FIGS. 13A and 13B, the frequency switching circuit 300 may be simply constituted by, for example, only a varicap diode.

As has been described above, the wireless terminal according to this embodiment uses a common conversion table in order to generate both a connection control signal for a control of selection from a plurality of RF circuits, and a frequency control signal for an operating frequency control of a reconfigurable antenna. Therefore, the wireless terminal according to this embodiment is capable of achieving synchronization between the control of selection from the plurality of RF circuits and the operating frequency control of the reconfigurable antenna.

(Second Embodiment)

Figure 3:
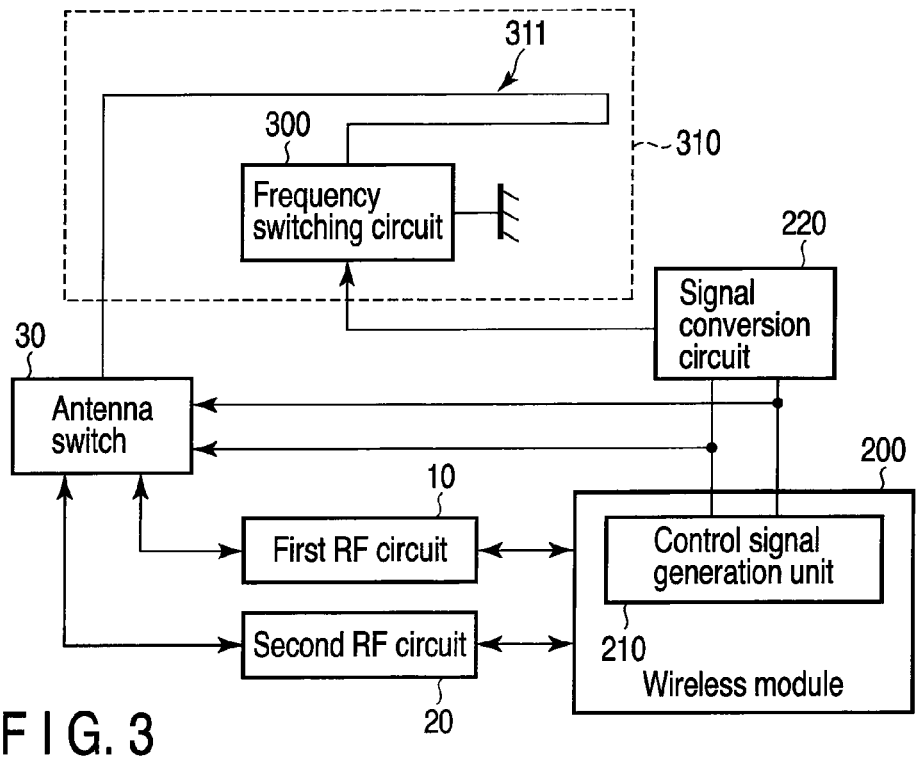
FIG. 3 is a block diagram representing an example of a wireless terminal according to the second embodiment.

As represented in FIG. 3, the wireless terminal according to a second embodiment of the invention comprises a first RF circuit 10, a second RF circuit 20, an antenna switch 30, a wireless module 200, a signal conversion circuit 220, and an antenna 310. The wireless terminal in FIG. 3 uses the first RF circuit 10 and the second RF circuit 20 by switching these circuits 10 and 20 in accordance with switching between wireless communication systems or switching between signal transmission and signal reception. In descriptions made below, the same components as those in the first embodiment will be denoted at the same reference numerals as in the first embodiment, and different components from the first embodiment will be described mainly.

The wireless module 200 comprises a control signal generation unit 210. Components of the wireless module 200 except the control signal generation unit 210 may be the same as components in the wireless module 100 except the control signal generation unit 110.

The control signal generation unit 210 generates a connection control signal. Specifically, the control signal generation unit 210 generates the connection control signal according to switching between the wireless communication systems or switching between signal transmission and signal reception, by using an existing conversion table which associates types of the wireless communication systems or transmission/reception states with values of the connection control signal. The control signal generation unit 210 inputs the connection control signal to the antenna switch 30 and the signal conversion circuit 220.

The signal conversion circuit 220 converts the connection control signal from the control signal generation unit 210 into the frequency control signal, and inputs the frequency control signal to a frequency switching circuit 300. For example, the signal conversion circuit 220 is a logic circuit which performs a logical operation for converting a value of the connection control signal into a corresponding value of the frequency control signal. Thus, if the signal conversion circuit 220 generates the frequency control signal, no modification need be made to the existing conversion table which the control signal generation unit 210 uses. Accordingly, the wireless module 200 does not require any additional (unused) output terminal for the frequency control signal.

Although one frequency switching circuit 300 is provided in the wireless terminal in FIG. 3, the wireless terminal according to this embodiment may comprise a plurality of frequency switching circuits 300 as well. By providing a plurality of frequency switching circuits 300, the operating frequency of the antenna can be controlled more finely. Locations of the frequency switching circuits 300 can be typified into three locations. Specifically, the three locations are: (1) in a side of a feeding point of an antenna element (including a short point on the feeding point side); (2) in a side of a top end of the antenna element (a folding point insofar as a folded antenna is concerned); and (3) in a side of a short point of the antenna element (a grounded point). Naturally, if there is no short point on the antenna element, any frequency switching circuit 300 cannot be provided in the side of any short point on the antenna element. Details of the locations of the frequency switching circuits 300 are determined by designing in consideration of loss due to active elements comprised in the frequency switching circuits 300.

A configuration example will now be described below in a case of providing the folded monopole antenna with two frequency switching circuits 300-1 and 300-2.

In wireless terminals represented in FIGS. 9 and 10 each, the frequency switching circuits 300-1 and 300-2 are provided respectively in (1) the side of a feeding point of an antenna element 351 and in (3) the side of a short point of the antenna element 351. Alternatively, the plurality of frequency switching circuits 300-1 and 300-2 may be respectively provided in (1) the side of a feeding point of an antenna element and in (2) the side of a folding point of the antenna element, or in (2) the side of a folding point of an antenna element 371 and in (3) the side of a short point of the antenna element 371. In the wireless terminal in FIG. 9, the frequency switching circuits 300-1 and 300-2 are controlled by a common frequency control signal from the signal conversion circuit 220. On the other side, in the wireless terminal in FIG. 10, the frequency switching circuits 300-1 and 300-2 are respectively controlled by individual frequency control signals. If the plurality of frequency switching circuits 300 are controlled by a common frequency control signal, as in the wireless terminal in FIG. 9, the signal conversion circuit 220 can be constructed in a simple configuration (i.e., the same configuration as that in a case of using only one frequency switching circuit 300). Otherwise, if the plurality of frequency switching circuits 300 are respectively controlled by individual frequency control signals, as in the wireless terminal in FIG. 10, individuals of the frequency switching circuits 300 can be controlled independently from each other, and accordingly, the operating frequency of the antenna can be controlled more finely. However, in a case of generating individual frequency control signals, a plurality of signal conversion circuits for generating the plurality of frequency control signals are required. That is, a circuit size and power consumption increase.

As has been described above, the wireless terminal according to this embodiment converts a connection control signal for a control of selection from a plurality of RF circuits, into a frequency control signal for an operating frequency control of a reconfigurable antenna. Therefore, the wireless terminal according to this embodiment is capable of achieving synchronization between the control of selection from the plurality of RF circuits and the operating frequency control of the reconfigurable antenna, without modification for an existing wireless module.

The invention is not directly limited to the above embodiments but can be implemented with modifications to components of the invention without deviating from the subject matter of the invention, in implementation phases. Further various aspects can be derived by appropriately combining a plurality of components disclosed in the above embodiments. A configuration can be derived in which several components may be removed from all components disclosed in each of the embodiments. In addition, components described in different embodiments may be appropriately combined with each other.

What is claimed is:

1. A wireless terminal, comprising:
an antenna which comprises:
a first antenna element comprising a feeding point, a folding point, and a short point;
a second antenna element that is branched from a first point between the feeding point and the folding point of the first antenna element;
a stab short-circuiting a second point between the feeding point and the folding point of the first antenna element and a third point between the folding point and the short point of the first antenna element; and at least one frequency switching circuit to control an operating frequency of the first antenna element in accordance with a frequency control signal, the at least one frequency switching circuit being inserted between the folding point and the short point of the first antenna element;

a plurality of RF circuits to perform an RF signal processing;

an antenna switch to connect the antenna to one of the plurality of RF circuits in accordance with a connection control signal; and a generation unit configured to generate the frequency control signal and the connection control signal in accordance with switching between a plurality of wireless communication systems or switching between transmission and reception, wherein an electric length to the short point of the first antenna element from the feeding point of the first antenna element through the second point, the stab, and the third point is substantially ½ of a wavelength corresponding to a resonance frequency of the second antenna element.

2. The terminal according to claim 1, wherein the generation unit uses a table which associates types of the plurality of wireless communication systems or states of the transmission and reception with values of the frequency control signal and values of the connection control signal.

3. A wireless terminal, comprising:
an antenna which comprises:
a first antenna element comprising a feeding point, a folding point, and a short point;
a second antenna element that is branched from a first point between the feeding point and the folding point of the first antenna element;
a stab short-circuiting a second point between the feeding point and the folding point of the first antenna element and a third point between the folding point and the short point of the first antenna element; and at least one frequency switching circuit to control an operating frequency of the first antenna element in accordance with a frequency control signal, the at least one frequency switching circuit being inserted between the folding point and the short point of the first antenna element;

a plurality of RF circuits to perform an RF signal processing;

an antenna switch to connect the antenna to one of the plurality of RF circuits in accordance with a connection control signal;

a generation unit configured to generate the connection control signal in accordance with switching between wireless communication systems or switching between transmission and reception; and a conversion circuit to convert the connection control signal into the frequency control signal, wherein an electric length to the short point of the first antenna element from the feeding point of the first antenna element through the second point, the stab, and the third point is substantially ½ of a wavelength corresponding to a resonance frequency of the second antenna element.

4. The terminal according to claim 3, wherein the conversion circuit converts the connection control signal into the frequency control signal by performing a logical operation on the connection control signal.

* * * * *